May 21, 1968 R. F. ROBINSON ET AL 3,384,496
APPLE PRODUCT
Filed Aug. 19, 1964
FIG. 1
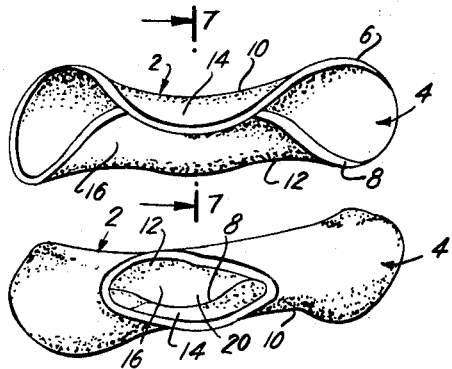
FIG. 2
FIG. 3
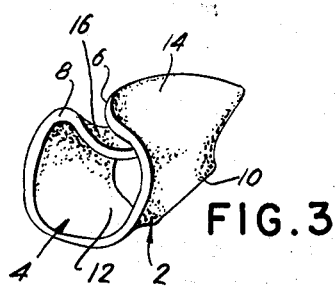
FIG. 4
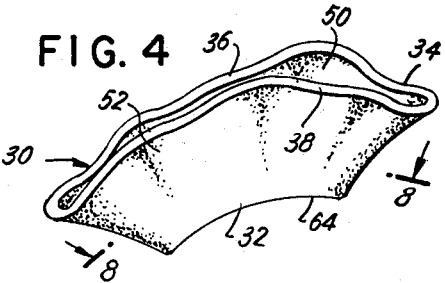
FIG. 5
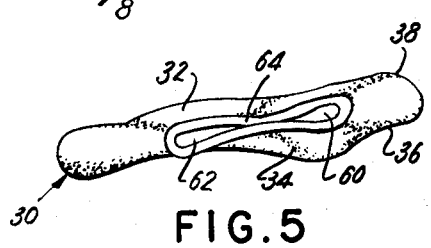
FIG. 6
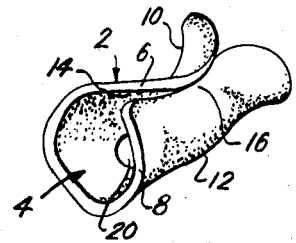
FIG. 7
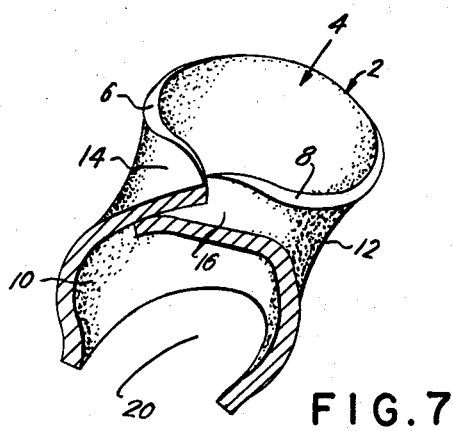
FIG. 8
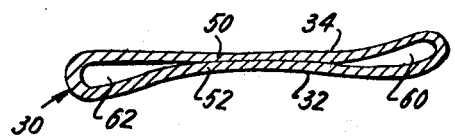

3,384,496
APPLE PRODUCT
Radcliffe Franklin Robinson, Highland Park, Ralph Fine, East Brunswick, William Hubert Lehmacher, New Brunswick, and David R. Davis, Somerville, N.J., assignors to Colgate Palmolive Company, New York, N.Y., a corporation of Delaware
Filed Aug. 19, 1964, Ser. No. 390,609
2 Claims. (Cl. 99—204)

ABSTRACT OF THE DISCLOSURE

A process for preparing convoluted, dried apple slices which comprises heating apple slices having a biologically normal moisture content to render said slices pliant and reduce the moisture content thereof, convoluting said slice to form a three dimensional configuration wherein at least a part of the perimeter and adjacent area of one side of said slices and at least part of the perimeter and adjacent area of the opposite side of said slices are bent proximate to one another and rapidly cooling said convoluted slices to impart a brittle nature thereto; and the convoluted apple slice produced by the process.

---

This invention relates to a process for preparing a crisp, dry apple product. More particularly, this invention relates to a process for preparing crisp convoluted apple slices and to the convoluted apple slices themselves.

Broadly, this invention contemplates a process for preparing a three-dimensional substantially convoluted apple product which comprises heating apple slices having a biologically normal moisture content to reduce the moisture content of said slices and to render said slices pliant, convoluting said apple slices whereby substantially convoluted, three-dimensional configurations are formed, and rapidly cooling said convoluted apple slices to impart a brittle, substantially non-pliant nature thereto.

In the process according to this invention, an important feature resides in the step of convoluting the substantially pliant apple slices. By "convoluting" is meant the feature of distorting the surface of the apple slices to result in at least part of the perimeter and adjacent area of one side of said slices and at least part of the perimeter and adjacent area of the opposite side of said slices being bent at least proximate to one another. In the practice of this invention, it has been found that this convolution can be effected most suitably in one of the following ways.

If apple slices are vertically suspended from a bar, hook, wire, and the like and dried while in this vertically suspended condition, it was unexpectedly discovered that the apple slices assume a convoluted configuration resembling the integer 8.

Apple slices may also be convoluted by drying said slices while tumbling them in a rotating, preferably perforated, drum. Although a perforated rotating drum is preferred, any device may be used which would enable the apples to repeatedly free fall in a confined space before striking any of the confining surfaces of the device.

The convolution of the apple slices may also be effected by allowing them to free fall in a wind-tunnel which convolutes the apple slices while they are falling. In yet another method of convoluting apple slices, the slices may be placed in a box or press and pressure applied to convolute them, such as by squeezing the sides of the box together or by lowering the press on the apple slices. In still another method of convoluting the slices, apple slices may be placed in a mold and pressure applied to convolute them in the shape of the mold.

Regardless of the method used to convolute the slices, it should be noted that the slices must be pliant and dry, that is, contain up to 3% moisture, during the convoluting step. The drying of apple slices and the rendering of said slices pliant may be accomplished as follows:

When drying the apple slices and rendering them pliant, the slices are placed in an oven or other suitable heating device and are dried by using hot, dry air at a temperature of from about 140° to about 300° F. and a relative humidity of up to 5.5%. If desired, a temperature of up to about 350° F. may be used for the first minute or so of drying to remove surface moisture from the slices.

During the drying, it is preferred that the hot, dry air flow past the slices at the rate of up to 700 linear feet per minute and preferably from 300 to 700 feet per minute. However, a static, hot, dry-air system may also be used.

The time required to dry the slices will generally vary from about twenty minutes to an hour if hot, dry air flows past the slices at a rate of from about 300 to about 700 linear feet per minute. If, however, a static hot-air system has been used, then the drying time will vary from about four to eight hours.

The drying time will vary depending upon the flow of air, the thickness of the apple slices, the variety of apple used, and the time of year the apples are picked and whether or not they have been stored for an appreciable length of time.

The drying time for similar batches of apples under similar conditions may be easily determined by removing a sample apple slice from the oven and allowing it to cool at room temperature. If, upon cooling, the pliant apple slice becomes brittle, it is dray. Succeeding batches of similar apple slices are then dried under the same conditions and for the same amount of time as the sample slice.

Additionally, even flat apple slices which have been previously dried may be convoluted. This is accomplished by heating the dry, flat slices to at least 140° F. at which temperature they become pliant. Thereafter, the dry, flat apple slices may be convoluted in any of the aforedescribed ways.

When the sample apple slice has become brittle upon cooling at room temperature, it has a moisture content of up to about 3% and as low as 0.8% as determined by the Cenco Moisture Meter.

If the slices have been dried while in a horizontal position, either on a tray or a conveyor belt, etc., they are then removed from their horizontal position and placed in a perforated, rotatable drum. Hot, dry air within the aforesaid temperature range and preferably at a velocity of from about 300 to 700 linear feet per minute is forced through the perforations in the drum while rotating the drum and in order to maintain the pliant nature of the apple slices. After the drum containing the apple slices has been rotating under the aforesaid conditions for up to about five minutes, the flow of hot, dry air is discontinued and cool, dry air is blown through the perforations in the rotatng drum in order to fix the physical form of the apple slices. The apple slices become brittle when they have cooled to a temperature below about 130° F. The apples removed from the drum are crisp, convoluted, golden brown and dry.

It has been found that batches of crisp apple slices prepared by tumbling the pliant apple slices in the perforated drum include certain characteristic reproducible physical forms.

All of the apple slices prepared according to the process of this invention are characterized in that at least part of the perimeter and adjacent area of one side of the dry apple slices and at least part of the perimeter and adjacent area of the opposite side of the apple slices are bent at least proximate to one another and in many instances actually contact one another either at the perimeter or the area immediately adjacent the perimeter.

In practicing this invention any variety of edible apples may be used, such as Delicious, Winesap, McIntosh, Cortland, Rome, York, Staymen, Golden Delicious, and the like.

The apples are first washed with water to remove therefrom any residue of pesticide. Thereafter the apples are cored, peeled, and sliced. Optionally, the peel may be left on the slices and the apples may be sliced so that each slice has a hole therein representing the removed portion of the core. However, the apples may also be sliced in such a manner so that they do not have a hole therein.

The thickness of the apple slices may vary from about 0.07 inch to about 0.25 inch. It has been found that the final product has optimum physical properties when the thickness of the apple slices is within this range.

Moreover, the apples need not be cut into separate slices but instead may be cut in a spiral-like manner. Accordingly, the term "apple slices," as used herein, includes the product resulting from cutting an apple in a spiral-like manner.

The apple slices may be treated to prevent premature browning by dipping them into an aqueous solution containing up to about 2% of a sulphite, such as sodium or potassium sulphite, sodium or potassium metabisulphite, or the like, Alternatively, the slices may be contacted with sulphur dioxide gas itself.

Because apples will vary in tartness, depending upon the time of year in which they were picked, wether or not they were stored, and the variety of apple used, it is preferable to determine the tartness by determining the acidity of a sample of the apples which have been processed to a moisture content of up to about 3% and which are crisp. If the apple sample possesses less than a desired amount of acid, which is a matter of preference of the processor and a matter of taste of the consumer, the tartness of the apples to be processed may be increased as will subsequently be described.

The tartness of the apple sample may easily be determined by crushing a weighed sample of the dry, crisp apple in water. The crushed apple sample is agitated with the water for up to about five minutes to assure that all of the acid in the apple sample is dissolved in the water. Thereafter, the slurry of crushed apple and water is filtered to remove the solid sample residue. The filtrate is then itrated with 0.1 N sodium hydroxide, using a suitable indicator, to an end point; and the amount of acid in the apple sample is then easily calculated.

If it is determined that the sample contains less than the preferred amount of acid, the acid content of the entire batch of non-processed apple slices may be adjusted by dipping the slices in an aqueous solution of up to about 5% of an acid such as citric, malic, trataric, ascorbic, formic, and the like.

The concentration of the acid solution used to raise the acidity of the apple slices is dependent upon the particular acid used and the amount of acid desired in the finished product. The acid concentration of the solution to be used is determined by dipping representative samples of the apple slices in acid baths of varying concentrations and processing the samples to a dry, crisp product. Thereafter, the amount of acid present in the several samples of crisp product is determined as previously described. In this manner, the processor can select the desired acid at what he deems to be the optimum concentration which would result in a crisp, dry product having his preferred final acid content.

It is often advantageous, prior to the heating step, to flavor the apple slices with sugar and/or cinnamon or any other suitable flavoring, such as peanut or other nut, onion or other spice, vanillin, and the like. If the flavoring used is a concentrated one, then a flavor carrier, such as flour, apple powder, or any other suitable carrier, is used in conjunction with the concentrated flavor.

This invention also contemplates a crisp convoluted apple product comprising an apple slice having a moisture content of up to about 3%, at least part of the perimeter and adjacent area of one side of said slice and at least part of the perimeter and adjacent area of the opposite side of side slice being bent at least proximate to one another.

In the drawing:

FIG. 1 is a top-plan view of one embodiment of this invention.

FIG. 2 is a bottom-plan view thereof; and

FIG. 3 is an end-elevational view thereof.

FIG. 4 is an isometric view of another embodiment of this invention; and

FIG. 5 is a bottom-plan view thereof.

FIG. 6 is an isometric view of the convoluted apple product of FIG. 1.

FIG. 7 is an enlarged cross-sectional view along the line 7—7 of FIG. 1 of the convoluted apple product.

FIG. 8 is a cross-sectional view along the line 8—8 of FIG. 4 of the convoluted apple product of that figure.

Referring now to FIG. 1, the dry convoluted apple product 2 comprises a body 4 which has perimeters 6 and 8 and sides 10 and 12. The perimeter 6 and adjacent area 14 are bent so that, as seen in FIG. 7, the perimeter 6 contacts the adjacent area 16 of the side 12 while the perimeter 8 contacts the adjacent area 14 of the side 10, although such contact is not necessary and the perimeters and adjacent areas may be convoluted so that they are only proximate to one another.

In FIG. 2, the apple product 2 has a hole 20 therein which represents that portion of the core which was removed from the apple slice. However, it is not necessary that the non-processed apple be sliced through the hole representing the removed portion of the core.

FIG. 4 represents another embodiment of a dry convoluted apple product 30. In FIG. 4, the side 32 is bent at least proximate to the side 34 along its entire length. The perimeter 36 and the perimeter 38 are proximate to one another but do not contact one another.

As seen in FIGS. 4 and 8, the adjacent area 50 of the side 34 contacts the adjacent area 52 of the side 32. The apple product 30 (FIGS. 5 and 8) has holes 60 and 62 defined by the border 64.

In order to illustrate further the nature of this invention and the manner of practicing the same more fully, the following examples are presented.

Example I

McIntosh apples are hand washed with water and then fed into a core and peeler machine manufactured by the Pease company. After the apples are peeled and cored they are sliced with a Hobart food slicer which is set so that the resultant slices are 1/16-inch thick. The apples are sliced in such a manner that each slice has a hole in the center representing the portion of the core which was removed. The slices are then dipped in a mixture composed of 98% sugar and 2% cinnamon by weight.

A metal bar is then inserted through the hole of each cored slice. The slices are spaced from one another on the bar by a distance of 1½ inches. The bars are then placed in a Proctor & Schwartz hot air dehydrator which has been preheated to a temperature of 300° F. The hot air is circulated through the oven at a rate of 300 linear feet per minute and allowed to contact the apple slices for twenty-five minutes. After twenty-five minutes the apple slices, which have formed a configuration resembling the integer 8, are removed from the oven and allowed to cool at room temperature. Upon cooling at room temperature the apple slices become crisp and permanently assume the integer 8 configuration.

Example II

Dry, non-convoluted brittle apple slices having a moisture content of not more than 3% are placed in a rotatable drum. The drum is then placed in the oven of Example I which has been preheated and pre-set to provide an air flow of 650 linear feet per minute at a temperature of 250° F. The drum is rotated for from two to three minutes. During this time the apple slices become pliant and are tumbled to form pliant apple slices having the novel configuration of this invention.

The still-pliant apple slices are then removed from the oven and allowed to cool at room temperature, whereupon they become crisp and their convoluted physical form is fixed.

Example III

Greenings apples are washed and hand cored. Approximately one half of the apples are hand peeled. All of the apples are sliced, using a Hobart Food Slicer, to form slices having a thickness of 0.09 inch each. Twenty-four slices are thus obtained, consisting of twelve peeled slices and twelve non-peeled slices.

Six peeled slices and six non-peeled slices are dipped into a mixture of 98% sugar and 2% cinnamon by weight. The remaining slices are untreated.

All of the slices are placed on perforated trays having a Teflon coating to assure that the slices will not adhere to the tray.

The slices are then placed in a Freas forced-air oven which has been pre-heated to a temperature of 250° F. by 350 linear feet per minute of hot, dry air.

The slices remain in the oven at the aforesaid temperature and rate of air flow for twenty minutes. During the twenty minutes, the slices are turned over periodically. After twenty minutes, the slices are removed from the oven and placed in a perforated basket having a handle. The basket containing the slices is then placed in the Freas oven at the same temperature-air flow conditions as aforedescribed. After remaining in the oven for five minutes, the door of the oven is opened and the basket, which remains in the oven, is hand rotated for fifteen minutes causing the apples to tumble and convolute. The basket containing the still-pliant convoluted slices is then removed from the oven and allowed to cool at room temperature. Upon cooling, the slices become brittle and thus permanently convoluted.

The process of this invention results in a convoluted apple product wherein the majority of the dried apple slices have a reproducible three-dimensional configuration. Moreover, the reproducible dry convoluted apple slice configuration is advantageous in that the consumer will be able to identify the configuration of the dry apple slice with the manufacturer. This is particularly advantageous because it enables the manufacturer to produce dry, convoluted apple slices of high quality which the consumer, after repeated use, will associate with the manufacturer's high quality and will be assured of receiving a high quality product by mere visual appearance of the product.

While this invention has been described in terms of certain preferred embodiments and illustrated by means of specific examples, the invention is not to be construed as limited except as set forth in the following claims.

What we claim and desire to secure by Letters Patent is:

1. A process for preparing convoluted, brittle apple slices having a reduced moisture content which comprises heating apple slices having a biologically normal moisture content to reduce the moisture content of said slices to up to about 3% moisture and to render said slices pliant, tumbling said pliant slices having a moisture content of up to 3% in a rotating drum while circulating dry air at a temperature of from 140° F. to about 260° F. past said tumbling slices, said slices being convoluted to form a substantially convoluted three-dimensional configuration, and rapidly cooling said convoluted slices to below 130° F. to impart a brittle, substantially non-pliant nature thereto.

2. A process in accordance with claim 1 wherein said apple slices are dipped in a bath containing up to 2% of an acid selected from the class consisting of citric, malic, tartaric and ascorbic acid and removed from said acid bath prior to said heating step.

References Cited

UNITED STATES PATENTS

| | | | |
|---|---|---|---|
| 2,901,359 | 8/1959 | Forkner | 99—204 |
| 3,113,875 | 12/1963 | Prater et al. | 99—204 |
| 3,235,391 | 2/1966 | Dorsey | 99—204 |

HYMAN LORD, *Primary Examiner.*

M. VOET, *Assistant Examiner.*